(12) United States Patent
Guan et al.

(10) Patent No.: US 10,686,877 B2
(45) Date of Patent: Jun. 16, 2020

(54) NETWORK COMMUNICATION METHOD, PEERS, AND NETWORK COMMUNICATION SYSTEM

(71) Applicants: Chi Guan, Tianjin (CN); Khanh dinh Lai, Santa Ana, CA (US)

(72) Inventors: Chi Guan, Tianjin (CN); Khanh dinh Lai, Santa Ana, CA (US)

(*) Notice: Subject to any disclaimer, the term of this patent is extended or adjusted under 35 U.S.C. 154(b) by 70 days.

(21) Appl. No.: 16/027,722

(22) Filed: Jul. 5, 2018

(65) Prior Publication Data
US 2019/0379732 A1    Dec. 12, 2019

Related U.S. Application Data

(63) Continuation-in-part of application No. PCT/CN2018/090277, filed on Jun. 7, 2018.

(51) Int. Cl.
*H04L 29/08* (2006.01)

(52) U.S. Cl.
CPC .......... *H04L 67/1061* (2013.01); *H04L 67/10* (2013.01); *H04L 67/104* (2013.01); *H04L 67/1046* (2013.01); *H04L 67/1068* (2013.01); *H04L 67/1095* (2013.01)

(58) Field of Classification Search
CPC .... H04L 67/10; H04L 67/104; H04L 67/1068
See application file for complete search history.

(56) References Cited

U.S. PATENT DOCUMENTS

| | | | | |
|---|---|---|---|---|
| 7,130,921 B2* | 10/2006 | Goodman | ............. | H04L 67/104 709/244 |
| 7,139,798 B2* | 11/2006 | Zircher | .................. | G06Q 10/10 709/204 |
| 7,421,708 B2* | 9/2008 | Vass | ...................... | H04L 67/104 719/320 |
| 7,490,140 B2* | 2/2009 | Goodman | ............. | H04L 67/104 709/219 |
| 7,596,625 B2* | 9/2009 | Manion | ................. | H04L 63/104 709/232 |
| 7,653,059 B1* | 1/2010 | Slaughter | ................ | H04L 45/02 370/392 |
| 7,660,889 B2* | 2/2010 | Gotesdyner | ........... | H04L 67/104 370/254 |

(Continued)

*Primary Examiner* — Lashonda T Jacobs
(74) *Attorney, Agent, or Firm* — Westman, Champlin & Koehler, P.A.

(57) ABSTRACT

The present solution provides a network communication method, peers and a network communication system, the method includes establishing communication with a communication room peer, and obtaining a capacity of the communication room peer, and an IP address and a port of communication room; establishing communication with a pilot peer, obtaining an IP address and a port of the pilot peer, sending a capacity of the communication room and a total number of user peers to the pilot peer, so that the pilot peer creates a required number of communication room peers based on the capacity of the communication room and the total number of user peers; and establishing communication with the user peers, sending the IP address and the port of the communication room peer to the user peers, so that the user peers join in the corresponding communication room peer to perform communication.

18 Claims, 5 Drawing Sheets

---

Establishing communication with the discovery peer, and sending capacity of the communication room peer to the discovery peer to enable the discovery peer to send the capacity of communication room and a total number of user peers to a pilot peer, so that the pilot peer creates a required number of communication room peers according to the capacity and the total number of the user peers — 401

Sending the address of the communication room peer that corresponds to the user peers to the discovery peer to enable the discovery peer to send the address of the communication room peer to the user peers, so that the user peers join the corresponding communication room peer — 402

Receiving messages sent by the user peers which have joined the communication room peer, and forwarding the messages to other user peers and pilot peers which have joined the communication room peer — 403

(56) References Cited

U.S. PATENT DOCUMENTS

| | | | |
|---|---|---|---|
| 7,720,978 B2* | 5/2010 | Zhu | H04L 45/04 709/228 |
| 7,756,924 B2* | 7/2010 | Kaler | H04L 67/1059 709/204 |
| 7,881,316 B2* | 2/2011 | Kaler | G06F 9/5072 370/401 |
| 7,953,083 B1* | 5/2011 | Evans | H04L 67/104 370/390 |
| 8,027,342 B2* | 9/2011 | Venkitaraman | H04L 12/2809 370/254 |
| 8,275,864 B1* | 9/2012 | Slaughter | H04L 45/02 709/223 |
| 8,370,523 B1* | 2/2013 | Slaughter | H04L 45/742 709/238 |
| 8,693,391 B2* | 4/2014 | Garcia-Martin | H04L 29/06027 370/328 |
| 8,806,020 B1* | 8/2014 | Lewis | H04W 36/0066 709/227 |
| 8,843,835 B1* | 9/2014 | Busey | H04L 12/1813 715/739 |
| 8,880,670 B1* | 11/2014 | Lansing | H04L 67/1044 370/254 |
| 8,923,267 B2* | 12/2014 | Soliman | H04W 76/14 370/343 |
| 9,462,018 B2* | 10/2016 | Setton | H04N 21/4788 |
| 9,949,305 B2* | 4/2018 | Montemurro | H04L 67/1068 |
| 2002/0147771 A1* | 10/2002 | Traversat | G06F 9/4416 709/203 |
| 2002/0161821 A1* | 10/2002 | Narayan | G06F 9/5061 709/201 |
| 2004/0064693 A1* | 4/2004 | Pabla | H04L 63/02 713/168 |
| 2005/0169219 A1* | 8/2005 | Serpa | H04L 29/12254 370/338 |
| 2005/0251577 A1* | 11/2005 | Guo | H04L 67/104 709/230 |
| 2007/0038758 A1* | 2/2007 | Mu | H04L 12/1818 709/227 |
| 2008/0013546 A1* | 1/2008 | Bhatt | H04L 12/14 370/395.52 |
| 2008/0162408 A1* | 7/2008 | Li | G06F 16/951 |
| 2009/0228944 A1* | 9/2009 | Bodlaender | H04L 12/1827 725/110 |
| 2010/0180217 A1* | 7/2010 | Li | H04L 12/1818 715/758 |
| 2010/0250589 A1* | 9/2010 | Tsai | G06F 16/2246 707/770 |
| 2011/0277018 A1* | 11/2011 | Weizman | H04L 29/12028 726/4 |
| 2011/0277022 A1* | 11/2011 | Weizman | H04L 29/12528 726/7 |
| 2012/0020238 A1* | 1/2012 | Suetsugu | H04L 51/04 370/252 |
| 2012/0047270 A1* | 2/2012 | Chandrasekaran | H04L 41/12 709/227 |
| 2012/0079031 A1* | 3/2012 | Matthews | H04L 12/18 709/206 |
| 2012/0331073 A1* | 12/2012 | Williams | H04L 67/1065 709/206 |
| 2013/0342637 A1* | 12/2013 | Felkai | H04N 7/14 348/14.08 |
| 2014/0280585 A1* | 9/2014 | Smith | H04W 4/21 709/204 |
| 2014/0280989 A1* | 9/2014 | Borkowski | H04L 67/104 709/228 |
| 2014/0379791 A1* | 12/2014 | Chaturvedi | H04L 29/12528 709/203 |
| 2016/0165494 A1* | 6/2016 | Warburton | H04L 67/1072 370/329 |
| 2019/0297119 A1* | 9/2019 | Vashisht | H04L 65/4023 |

* cited by examiner

NETWORK COMMUNICATION METHOD, PEERS, AND NETWORK COMMUNICATION SYSTEM

TECHNICAL FIELD

The present application pertains to the technical field of communication, and more particularly to a network communication method, peers, and a network communication system.

BACKGROUND

At present, many large scale enterprises have set up cloud computing and cloud service platforms, which can provide a basic architecture and technology for supporting operation of software or hardware, such that application developers can obtain services and technologies of calculation, information transmission, etc., through the cloud platform. In the related art, in one aspect, the basic architecture of providing cloud computing and cloud services is mainly monopolized by some fixed large scale enterprises, which obstructs the development of technology; in another aspect, when a performance of network communication is not based on the basic architecture of these large scale enterprises, the network communication is generally restrained to connection and communication of two IP (Internet Protocol) addresses, and if there is a need to support more users to join in communication, a server needs to be expanded; however, a manufacturing cost of the server is quite expensive, what's more, connection and communication between the server and the IP addresses behind a firewall or a router can't be realized.

Technical Problem

In view of this, embodiments of the present solution provide a network communication method, peers, and a network communication system, which aims at solving a problem in related art that a manufacturing cost of server is quite expensive, and the server can't connect and communicate with IP addresses behind the firewall and the router.

SUMMARY

In a first aspect, embodiments of the present solution provide a network communication method, the network communication method is applied to a peer-to-peer network communication system, the peer-to-peer network communication system comprises one or more discovery peers, one or more pilot peers, one or more communication room peers and at least two user peers;

wherein, the discovery peer is configured to discover IP addresses and ports of other peers, the pilot peer is configured to create the communication room peers and share data in the communication room peers; the communication room peer is configured to temporarily store and transmit communication data; the user peers are configured to join communication room to join in communication;

the network communication method comprises:

establishing communication with the communication room peer, and obtaining a capacity of the communication room peer, and an IP address and a port of communication room;

establishing communication with the pilot peer, obtaining an IP address and a port of the pilot peer, sending a capacity of the communication room and a total number of the user peers to the pilot peer, so that the pilot peer creates a required number of communication room peers based on the capacity of the communication room and the total number of the user peers; and establishing communication with the user peers, sending the IP address and the port of the communication room peers to the user peers, so that the user peers join in the corresponding communication room peer to perform communication.

In a second aspect, embodiments of the present solution provide a network communication method, the network communication method is applied to a peer-to-peer network communication system and comprises:

establishing communication with one or more discovery peers;

receiving a capacity of a communication room peer and a total number of user peers sent by a discovery peer;

establishing a required number of communication room peers according to the capacity and the total number of user peers which join in communication to enable the communication room peer to establish communication with the discovery peer, and send an IP address and a port of the communication room peer to the user peers, such that the user peers join in corresponding communication room and join in communication along with the communication room peer.

In a first possible embodiment mode of the second aspect, the network communication method further comprises:

synchronizing all pilot peers together and synchronizing all communication room peers together, so that one user peer resides in one communication room peer can communicate with another user peer resides in a different communication room peer.

In a third aspect, embodiments of the present solution provide a network communication method, the network communication method is applied to a peer-to-peer network communication system and comprises:

establishing communication with a discovery peer, and sending a capacity of a communication room peer to the discovery peer to enable the discovery peer to send the capacity of the communication room and a total number of user peers to a pilot peer, so that the pilot peer creates a required number of communication room peers according to the capacity and the total number of the user peers;

sending an address of the communication room peer that corresponds to the user peers to the discovery peer to enable the discovery peer to send the address of the communication room peer to the user peers, so that the user peers join in the corresponding communication room peer; and receiving messages sent by the user peers which have joined in the communication room peer, and forwarding the messages to other user peers and pilot peers which have joined in the communication room peer.

In a fourth aspect, embodiments of the present solution provide a discovery peer, comprising;

a first communication module configured to establish communication with a communication room peer, and obtain a capacity of the communication room peer and an IP address and a port of communication room;

a first sending module configured to establish communication with a pilot peer, obtain an IP address and a port of the pilot peer, and send the capacity of the communication room peer and a total number of user peers to the pilot peer, so that the pilot peer creates a required number of communication room peers based on the capacity of the communication room and the total number of user peers;

a second sending module configured to establish communication with a user peer, and send the IP address and the port of the communication room peer to the user peer, so that the user peer join in the corresponding communication room peer to perform communication.

In a fifth aspect, embodiments of the present solution provide a pilot peer, comprising:

a second communication module configured to establish communication with one or more discovery peers;

a first receiving module configured to receive a capacity of a communication room peer and a total number of user peers sent by the discovery peer; and a communication room creating module configured to create a required number of communication room peers according to the capacity and the total number of user peers which have joined in communication to enable the communication room peer to establish communication with the discovery peer, and send an IP address and a port of the communication room peer to the user peers, so that the user peers join in corresponding communication room and join in communication along with the communication room peer.

In a sixth aspect, embodiments of the present solution provide a communication room peer, comprising:

a third communication module configured to establish communication with a discovery peer, and send a capacity of a communication room peer to the discovery peer to enable the discovery peer to send the capacity of the communication room and a total number of user peers to a pilot peer, so that the pilot peer creates a required number of communication room peers according to the capacity and the total number of user peers;

a third sending module configured to send an address of the communication room peer that corresponds to the user peer to the discovery peer to enable the discovery peer to send the address of the communication room peer to the user peers, so that the user peers join in the corresponding communication room peer; and an information sharing module configured to receive messages sent by the user peers which have joined in the communication room peers and forward the messages to other user peers and pilot peers which have joined in the communication room peer.

In a seventh aspect, embodiments of the present solution provide a network communication system comprising one or more discovery peers, one or more pilot peers, one or more communication room peers, user peers, a memory, a processor and computer program stored in the memory and executable by the processor, wherein when the processor executes the computer program, steps in the aforesaid network communication method are implemented.

In an eighth aspect, embodiments of the present solution provide a computer readable storage medium which stores computer program, wherein when the computer program is executed by a processor, steps in the aforesaid network communication method are implemented.

The advantageous effects achieved by implementing the technical solutions provided by the embodiments of the present solution are as follows: the embodiments of the present solution is based on a peer-to-peer network communication, by establishing communication with the pilot peer, the communication room peer and the user peer, and obtaining the capacity of the communication room peer to enable the pilot peer to establish a required number of communication room peers according to the capacity and the number of the user peers, and sending the address information of the communication room peer to the user peer, such that the user peer can join in the corresponding communication room peer; in this way, a large number of user peers can join in the communication room peers to join in network communication and to deliver the same data or message to other user peers that reside in different communication room peers; a de-centralization of network communication is realized, and a disadvantage that it needs to spend huge cost to create a server traditionally is overcome; and a problem that each user peer needs to communicate with a large number of other users at the same time at the absence of central server is solved; and a basic architecture and service for achieving simultaneous communication among a large number of users are provided, and a requirement that a plurality of user peers join in communication simultaneously is met, so that the present application has a strong usability and practicability.

The present summary is provided only by way of example, and not limitation. Other aspects of the present invention will be appreciated in view of the entirety of the present disclosure, including the entire text, claims and accompanying figures.

BRIEF DESCRIPTION OF THE DRAWINGS

In order to describe the technical solutions of the embodiments of the present application more clearly, a brief introduction regarding the accompanying drawings that need to be used for describing the embodiments or the prior art is given below; it is obvious that the accompanying drawings described as follows are only some embodiments of the present application, for those skilled in the art, other drawings can be obtained according to the current drawings on the premise of paying no creative labor. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

EMBODIMENTS OF THE PRESENT APPLICATION

In the following description, in order to describe but not intended to limit, concrete details such as specific system structure, technique, and so on are proposed, thereby facilitating comprehensive understanding of the embodiments of the present application. However, it should be clear for those ordinarily skilled in the art that, the present application can also be implemented in some other embodiments without these concrete details. In some other conditions, detailed explanations of method, circuit, device and system well known to the public are omitted, so that unnecessary details can be prevented from obstructing the description of the present application.

It should be understood that, when a term "comprise" is used in the description and annexed claims, the term "include" indicates existence of the described characteristics, the whole, steps, operations, elements and/or components, but not exclude existence or adding of one or more other characteristics, the whole, steps, operations, elements, components and/or combination thereof.

It should also be understood that, terms used in the description of the present application are for the purpose of describing specific embodiments but not intended to limit the present application. As is used in the description and the annexed claims of the present application, unless other conditions are indicated clearly in the context, otherwise, singular forms of terms such as "a", "one", "the" are intended to include plural forms.

It should be further understood that, terms "and/or" used in the description and the annexed claims of the present application are referred to as any combination of one or more listed items associated with each other and all possible items, and including these combinations.

In order to describe the technical solutions of present application, the technical solutions of the present application are described below with reference to specific embodiments.

In the technical solution of the present application, by using discovery peer to establish communication with pilot peers, communication room peers and user peers to find IP addresses and ports of the pilot peer, the communication room peers, the user peers, and receive communication triggering instructions sent by the user peers, and send communication room information and communication mode information corresponding to the communication triggering instruction to the user peers, such that all the user peers can join in the corresponding communication room, and achieve a direct communication among the user peers through corresponding communication mode. Therefore, the user peers do not need to know IP addresses and ports of each other, a direct and point-to-point communication among the user peers can also be established.

Figure 1:
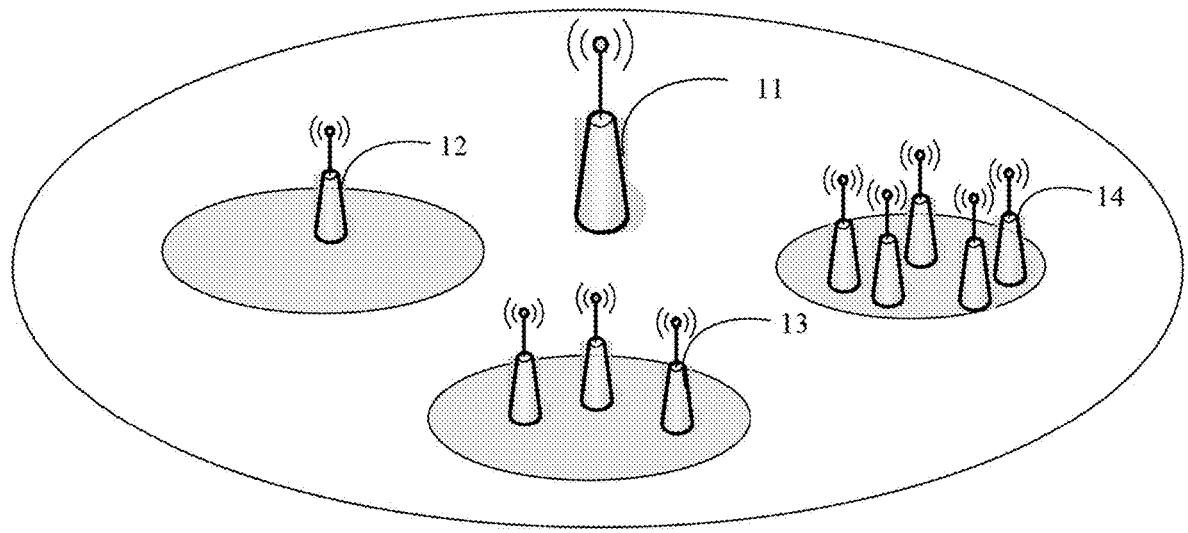
FIG. 1 illustrates a schematic diagram of a system scene applicable to a network communication method provided by an embodiment of the present application.

FIG. 1 is a schematic diagram of a system scene applicable to a network communication method according to an embodiment of the present application, for describing conveniently, only the part related to this embodiment is illustrated.

Referring to FIG. 1, the system at least comprises a discovery peer 11, at least one pilot peer 12, at least one communication room peer 13 and a plurality of user peers 14, wherein the user peers 14 can be any entity which possesses networking function, such as a computer, a tablet computer, a mobile phone, and the like. The discovery peer 11, the pilot peer 12 and the communication room peer 13 provide a basic architecture for the user peers 14; under said system scene, even if the user peers 14 are located behind a firewall or a router, a direct and point-to-point communication of the user peers 14 can still be realized through the arrangement of the discovery peer 11, the pilot peer 12 and the communication room peer 13; moreover, the discovery peer 11, the pilot peer 12 and the communication room peer 13 can be expanded, such that a large number of user peers 14 can be supported to join in communication at the same time.

Figure 2:
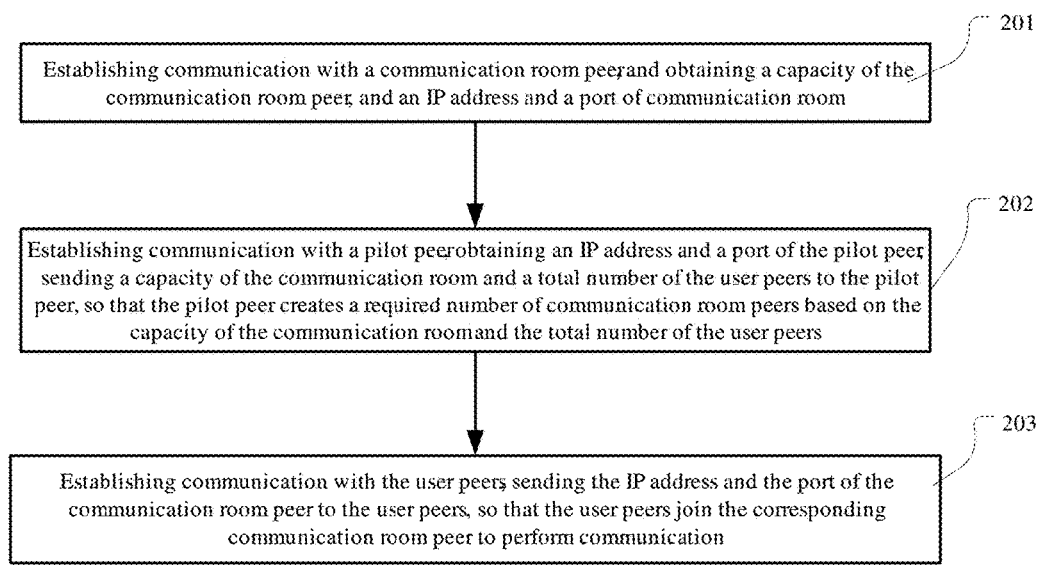
FIG. 2 illustrates a flow chart of implementing a discovery peer in the network communication method provided by an embodiment of the present application.

The network communication method under the system scene shown in FIG. 1 is described in detail below:

FIG. 2 illustrates an implementation flow chart of the network communication method according to the embodiment of the present application, this method is applied to a peer-to-peer network communication system, the peer-to-peer network communication system comprises one or more discovery peers, one or more pilot peers, one or more communication room peers and one or more user peers.

Wherein, the discovery peer is configured to discover IP (Internet Protocol) addresses and ports of other peers, the pilot peer is configured to create communication room peers and share data in the communication room peers, the communication room peer is configured to temporarily store and transmit communication data; the user peers are configured to join in the communication room to join in communication.

In this embodiment, the executive subject of the process is the discovery peer 11 shown in FIG. 1, and the process is described in detail as follows:

In step 201, establishing communication with communication room peers, and obtaining capacity of the communication room peers and the IP addresses and ports of communication room.

In this embodiment, each discovery peer can be a physical computer PC (Personal Computer) or a virtual PC terminal; the physical PC can comprise an electronic circuit which can perform a software process, or have the same function as the software process.

Each discovery peer has a global IP address, can be checked by other peers located at any place, and establish communication with the other peers; after the other peers establishes communication with the discovery peer, even if the other peers work behind the firewall or the router, and the discover peer can still find the IP addresses and the ports of the peers which have joined network and establish a communication connection through STUN/TURN (Simple Traversal of UDP Through NATs/Traversal Using Relays around NAT), the IP addresses and the ports include the IP address and the port of the pilot peer, the IP address and the port of the communication room peer and the IP addresses and the ports of the user peers.

The discovery peer can obtain the capacity of the current communication room by establishing communication with the communication room peers, and the capacity is the number of the user peers which have joined in the communication room currently, the number can be zero or one thousand or ten thousand, and the largest number of user peers which have joined in the communication room can be determined according to the quantity of messages that can be stored in the communication room.

If only one discovery peer establishes communication with one communication room peer, the discovery peer obtains the IP address and the port of the communication room peer and sends the IP address and the port to the user peers, such that the user peers can join in the communication room peer. If there are a plurality of discovery peers, each discovery peer may correspond to a particular application; for example, the first discovery peer can be an application program used for managing chatting and establishing communication with one user peer or one application program having a chat function, such that the user peer or the application program which has the chat function can join in the corresponding communication room; the second discovery peer can be an application program used for managing advertisements and establishing communication with a user peer or an application program having an advertisement publishing function, such that the user peer or the application program which have the advertisement publishing function can join in the corresponding communication room.

It should be noted that, the discovery peer may be a virtual machine or a PC having a global IP address.

Further, said establishing communication with a communication room peer and obtaining capacity of the communication room peer and the IP address and the port of the communication room comprises:

sending categories of the user peers which have joined in the communication room peers to other communication room peers.

In this embodiment, if there exist a plurality of communication room peers, the categories of the user peers which have joined in the communication room peers are shared to each of the communication room peers according to the known IP addresses and the ports of the communication room peers, such that the user peers in different communication room peers can communicate with each other, and the user peers can join in the appropriate communication room peers.

Step 202, establishing communication with the pilot peer, and obtaining the IP address and the port of the pilot peer, and sending the capacity of the communication room and the total number of the user peers to the pilot peer, so that the pilot peer creates a required number of communication room peers.

In this embodiment, each pilot peer is the peer used for creating communication room and monitoring the operation process of all communication room; the capacity is the number of the peers which have joined in the communication room peers, and the total number of the user peers is the total number of the user peers which have established communication with the discovery peer; the discovery peer establishes communication with the pilot peer, obtain the IP address and the port of the pilot peer, and send the capacity of the communication room peer to the pilot peer; even if the pilot peer works behind a firewall or a router, the discovery peer can still obtain the IP address and the port of the pilot peer; since message amount that can be stored in each communication room peer is limited, when the current communication room peer can't borne the current message amount, the pilot peer creates more required communication room peers according to the capacity and the total number of the user peers.

Further, said establishing communication with the pilot peer, and sending the capacity of the communication room and the total number of the user peers to the pilot peer, so that the pilot peer creates a required number of communication room peers based on the capacity of the communication room and the total number of the user peers comprises:

receiving the number of created communication room peers sent by the pilot peer

In this embodiment, after creating new communication room peers, the pilot peer sends the number of created communication room peers to the discovery peer, so that the user peers which have established communication with the discovery peer can join corresponding communication room peer.

Step 203, establishing communication with the user peers, sending the IP address and the port of the communication room peer to the user peers, so that the user peers join in the corresponding communication room peer to perform communication.

In this embodiment, before joining the communication room, the user peers need to establish communication with the discovery peer firstly, the discovery peer obtains the IP address and the port of the communication room peer to the user peers, such that the user peers can join in the corresponding communication room. The user peers can be one or more among a computer, a mobile phone or an embedded electronic device.

wherein, if the user peers which join in communication exceed the capacity of the current communication room peer, then, the discovery peer obtains the IP address and the port of the new communication room peer created by the pilot peer, and send the IP address and the port of the new communication room peer to the user peers, such that the user peers can join in the communication room suit for them.

The user peers which join in communication belong to application program which is set and implemented for a particular target and destination; therefore, each user peer can establish communication with different discovery peers according to a communication target and a communication destination thereof; as an alternative, the user peers can select a corresponding discovery peer and establish communication with the discovery peer by querying the global database and according to the communication target and the communication destination.

In this embodiment, the discovery peer establishes communication with the user peers and obtain the IP addresses and the ports of the user peers, send the IP addresses and the ports of the user peers to the communication room peer, it is the pilot peers which synchronize the messages or data to all pilot peers and to all corresponding communication room peers together, and it is the communication room peer which multicasts the messages or data to all user peers residing in the corresponding communication room peer, so that one user peer resides in one communication room peer can communicate with another user peer resides in a different communication room peer; and each of the user peers which have joined corresponding communication room peers can also send messages or data to the communication room peers through which the messages or data is forwarded to other user peers.

Furthermore, said establishing communication with the user peers, sending the IP address and the port of the communication room peer to the user peers, such that the user peers can join in the corresponding communication room peer to perform communication comprises:

creating a new discovery peer if the number of the user peers which have established communication connection exceeds the capacity of the current discovery peer, wherein the new discovery peer establishes communication with the user peers.

In this embodiment, the message amount that can be stored in each discovery peer is also limited, each discovery peer can process at most a hundred thousands of messages per second, and process message transmission between itself and other peers; if more users need to join in communication, the discovery peer can be continuously expanded, and the newly created discovery peer continues to establish communication connection with the user peer that needs to be in communication, and process the user peer that participates in communication in the same manner.

It should be noted that, the creation of the new discovery peer is realized by a load balancing software running in the first discovery peer.

In this embodiment, by using the discovery peer to establish communication with other peers, obtain the IP address and the port of the pilot peer, the IP address and the port of the communication room peer, and the IP addresses and ports of the user peers, communication room information can be provided for the user peers, such that the user peers can join in the corresponding communication room; so that the user peers which have joined in the communication room peers can send data to the communication room peers, and send the data to other user peers through the communication room peers; or as an alternative, data is obtained from the communication room, such that one user peer can communicate with thousands of other user peers that are either in the same communication room peer or in different communication room peers to exchange information, data, audios, videos and the like.

Figure 3:
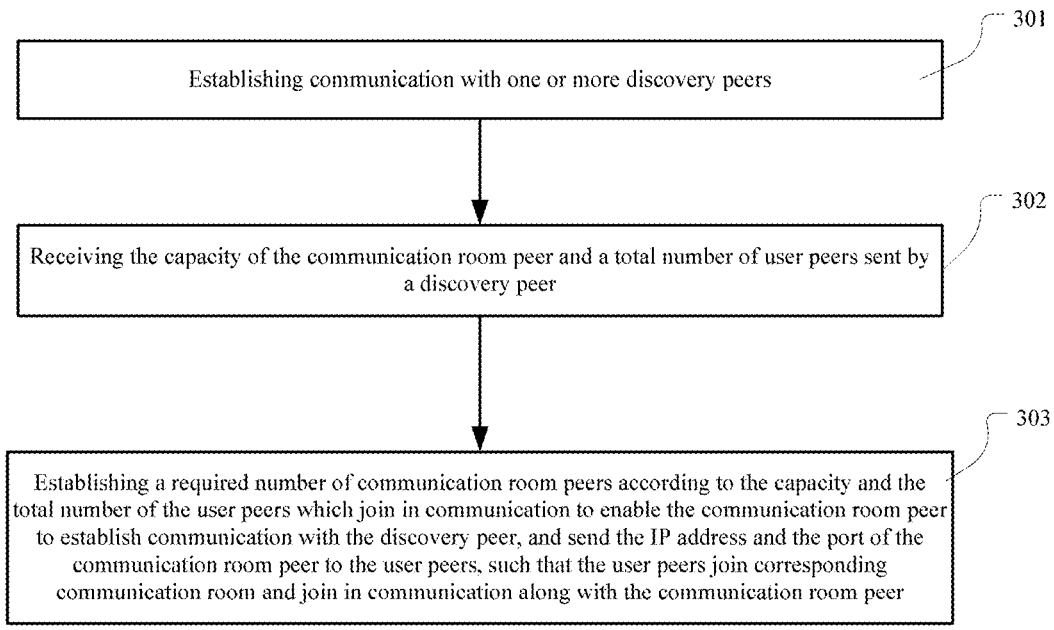
FIG. 3 illustrates a flow chart of implementing a pilot peer in the network communication method provided by the embodiment of the present application.

FIG. 3 illustrates an implementation process of a network communication method according to one embodiment of the present application. In this embodiment, the executive subject of the process is one of the pilot peer 12 shown in FIG. 1, which is described in detail as follows:

step 301, establishing communication with one or more discovery peers.

In this embodiment, the pilot peer is configured to create communication rooms, each pilot peer can be a computer comprising software process, or an electronic circuit or an integrated circuit which can perform functionalities similar to that of the software process.

Each pilot peer can process a hundred thousands of messages per second, if processing a message represents a new user that participates in network communication, then, each pilot peer can process a hundred thousands of transactions of joining peers in the network, and the pilot peer creates communication room for the user who joins in network, and ensures that the user peers which join in communication can join in the established communication room all the time; if it needs to process a transaction of one million users that join in communication, ten pilot peers need to be adopted, and the peers that join in communication are processed in the same manner, which can be particularly determined by the number of the pilot peer, the number of the user peers which establish communication with the discovery peer, and the message amount that can be borne by the pilot peer.

Figure 10:
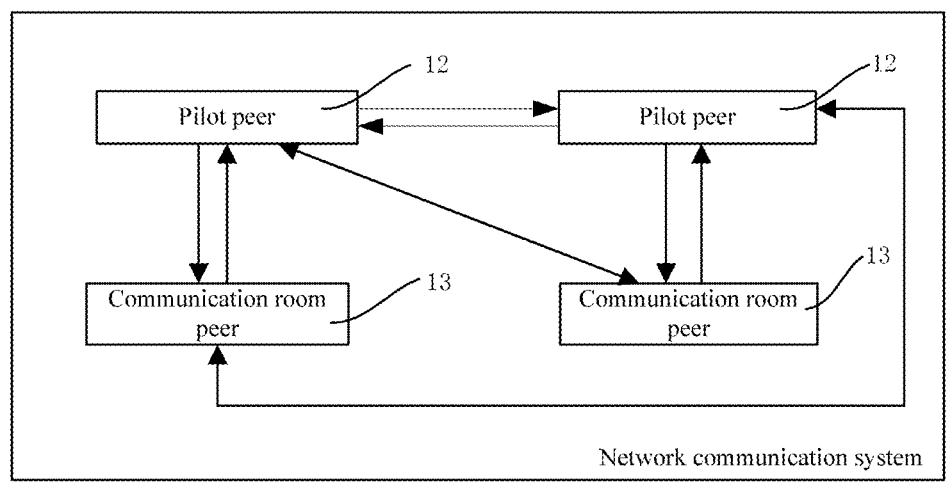
FIG. 10 illustrates how the pilot synchronize all pilot peers together and synchronize all communication room peers together so that one user peer resides in one communication room peer can communicate with another user peer resides in a different communication room peer in the communication network system.

Each pilot peer can establish communication with a plurality of discovery peers at the same time, thereby obtaining messages of capacity of different communication room sent by different discovery peers, and monitoring a situation that each user peer joins the communication room peer, and thereby synchronizing the situation that all user peers join in the communication room peers which is sent by the discovery peer to all communication room peers. In one embodiment, as shown in FIG. 10, all pilot peers and all communication room peers are synchronized together, so that one user peer resides in one communication room peer can communicate with another user peer resides in a different communication room peer.

In step 302, receiving capacity of the communication room peer and the total number of user peers sent by the discovery peer.

In this embodiment, and the capacity of the communication room peer is the number of the user peers which have joined in the communication room peers; the discovery peer can obtain the number of the user peers which have joined in the communication room peers by establishing communication with the communication room peer, the capacity of each of communication room peers can be zero, and can be one thousand or ten thousands, whether the user peers can continue to join in the communication room peers can be determined according to the capacity of the communication room peer.

In addition, except for monitoring the capacity of the communication room peer, the pilot peer can also track the information that the user peers leave the communication room peers.

It should be noted that, if the pilot peer disappears due to other reasons, the system can automatically detect and automatically run again through the corresponding software process and generate the pilot peer, and thereby guaranteeing that the pilot peer exists all the time.

Step 303, establishing a required number of communication room peers according to the capacity and the number of the user peers that join in communication so as to enable the communication room peer to establish communication with the discovery peer, and send the IP address and the port of the communication room peer to the user peers, so that the user peers join in the corresponding communication room and join in communication along with the communication room peer.

In this embodiment, the capacity is the number of the user peers which have joined in the communication room peer, the total number of the user peers is the number of the user peers which have established communication connection with the discovery peer; on the basis of the capacity of the current communication room peer, if the number of the user peers which join in communication currently is within the limit of the current communication room peer, a new communication room peer is not created, if the number of the user peers which join in communication currently exceeds the limit of the current communication room peer, the pilot peer establishes a new communication room peer according to the number of the user peers which join in communication currently; the new communication room peer establishes communication with the discovery peer, the discovery peer sends the IP address and the port of the communication room peer to the user peers which join in communication, such that the user peers can join in the communication room and implement a point-to-point network communication.

In this embodiment, the discovery peer establishes communication with each communication room peer, obtain the capacity of the communication room peer and IP addresses and ports of all communication room peers, and send the capacity, and the IP addresses and the ports to the pilot peer, the pilot peer sends the IP address and the ports to the user peers, such that the user peers can join in the corresponding communication room peer.

Furthermore, said creating a required number of communication room peers according to the capacity and the total number of user peers which join in communication so as to enable the communication room peers to establish communication with the discovery peer, and send the IP address and the port of the communication room peer to the user peers, so that the user peers join in corresponding communication room and join in communication along with the communication room peer comprises:

sending the number of created communication room peers to the discovery peer, such that the user peers which have established communication with the discovery peer can join in the corresponding communication room peer.

Furthermore, said creating a required number of communication room peers according to the capacity and the total number of user peers which join in communication so as to enable the communication room peers to establish communication with the discovery peer, and send the IP address and the port of the communication room peer to the user peers, so that the user peers join in corresponding communication room and join in communication along with the communication room peer further comprises:

joining the pilot peer in established communication room peer at the same time when the pilot peer creates the communication room peer; and receiving messages sent by the user peers which have joined in the communication room peers, and forwarding the messages to other communication room peers.

In this embodiment, pilot peers join in the communication room peers respectively, can receive data sent by the communication room peer, and forward the data to other communication room peers, such that the user peers in other communication room peers can also receive the data, thereby maintaining a synchronization and sharing of data among the communication room peers through the pilot peer; since the pilot peer can load and process messages more conveniently, the pilot peer are used for replacing the communication room peers so as to synchronize any message sent from any user peer to the corresponding communication room in each communication room peer.

Furthermore, the communication method further comprises: if the message amount of the communication room processed by the current pilot peers exceeds the capacity of the pilot peer, a new pilot peer is created, such that the new pilot peer can create more communication room peers and process messages of the communication room peers.

In the embodiment, an information processing load of each pilot peer is limited, and when the currently processed message amount exceeds a processing load of the current pilot peer, a new pilot peer needs to be created, and the new pilot peer establishes communication connection with the discovery peer in the same manner, creates a new communication room peer according to the capacity, and would share data among the communication room peers.

Each pilot peer can create communication room peers having different application types, for example, the same communication room peer can establish a communication room peer used for publishing advertisements, a communication room peer used for searching advertisements, a communication room peer used for chatting, and the like, and can also establish communication room peers corresponding to different application types according to the pilot peer that correspond to different applications.

In this embodiment, whether a new communication room peer needs to be created or not is determined by the pilot peer according to the number of the user peers that join in communication and the capacity of the current communication room peer, such that more user peers can be supported to join in the communication room to join in a point-to-point network communication. Meanwhile, more pilot peers can be adopted to create more communication room peers, thereby implementing the point-to-point network communication among more user peers.

Figure 4:
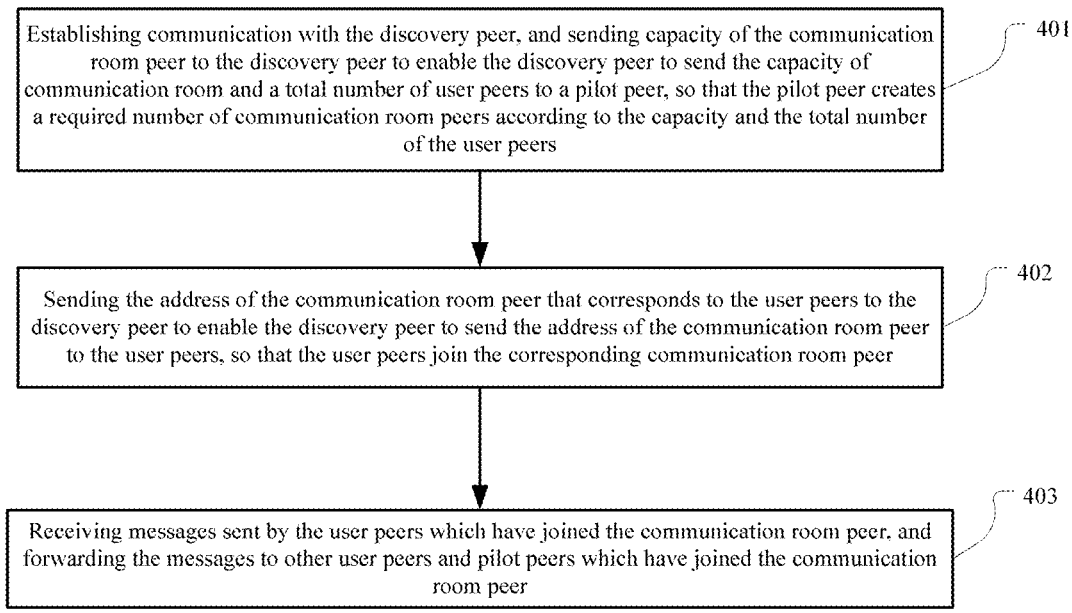
FIG. 4 illustrates a flow chart of implementing a communication room peer in the network communication method provided by the embodiment of the present application.

FIG. 4 illustrates an implementation flow chart of the network communication method provided by the embodiment of the present application. In this embodiment, the executive subjects in the flow chart is the communication room peer 13 in FIG. 1, since this embodiment is consistent with relevant steps and principles of the embodiments shown in FIG. 1 and FIG. 2, the relevant implementation principle is not repeatedly described herein.

step 401, establishing communication with a discovery peer, and sending a capacity of each communication room peer to the discovery peer to enable the discovery peer to send a capacity of a communication room and a total number of user peers to a pilot peer, so that the pilot peer establishes a required number of communication room peers according to the capacity and the total number of the user peers.

In this embodiment, the communication room peer is a computer including a software process, or an electronic circuit or an integrated circuit having the same function as the software process.

Each communication room peer establishes communication connection with the discovery peer, the discovery peer obtains information of the number of the user peers which have joined in the communication room peers, and establishes a required number of communication room peers according to the total number of the user peers, such that the user peers can join in the corresponding communication room to join in communication.

Further, said sending the communication room information corresponding to the user peers to the discovery peer to enable the discovery peer to send the communication room information to the user peers, so that the user peers join in the corresponding communication room peer comprises:

sending categories of the user peers which have joined in the communication room peers to the discovery peer, so that the discovery peer sends the categories of the user peers in each communication room peer to other communication room peers, and the user peers can join in the communication room peer suit for them according to notifications of the discovery peer.

Step 402, sending an address of the communication room peer corresponding to the user peers to the discovery peer to enable the discovery peer to send the address of the communication room peer to the user peers, such that the user peers can join in the corresponding communication room peer.

In this embodiment, the address of the communication room peer which corresponds to the user peer includes the IP address and the port of the communication room; every communication room peer establishes communication with the discovery peer, the discovery peer can obtain category information of all the user peers which have joined in the communication room peers, and send the communication room information corresponding to the user peers to the user peers according to targets and destinations of the user peers, thereby realizing the point-to-point network communication. The communication room peer can be divided into communication room peers having multiple application categories according to different requirements of the user peers, such as: the communication room peer used for publishing advertisements which can support the user peers that need to publish advertisements to join in the communication room peers so as to publish advertisements; the communication room peer used for searching advertisements, which can support the user peers which search advertisements to join in the communication room peer, the user peers can search advertisements according to their own needs; and the communication room peer used for chatting, which can support the user peers that need to have a chart to join in. That is, the communication room peers can be set as different types of applications according to different requirements, so that the communication requirements of the user peers can be met.

Wherein, each communication room peer can support a load service of message amount from ten thousands to a hundred thousands, and more communication room peers can be created by the pilot peer according to the user peers which join in communication and the increasing of demand, such that a plurality of communication room peers can provide a basic architecture for all user peers which use the peer-to-peer network to perform communication.

Furthermore, said sending the address of the communication room peer corresponding to the user peers to the discovery peer to enable the discovery peer to send the address of the communication room peer to the user peers, such that the user peers can join in the corresponding communication room peer comprises:

sending the categories of the user peers which have joined in the communication room peers to the discovery peer, such that the discovery peer can send the categories of the user peers in each of the communication room peers to other communication room peers.

Step 403, receiving the IP addresses and the ports of user peers sent by the discovery peer, and sending data to the user peers.

In this embodiment, the discovery peer can send the IP addresses and the ports of the user peers to the communication room peer, the communication room peer can send data, response or multicast data to all user peers which have joined in the communication room peers. The communication room peers can also receive the data sent by the user peers and forward the data to other user peers.

In addition, if the data or messages in the communication room peers is not suitable for any user peer which has joined in the communication room, then, in an effective capacity of the message, the message can contain user peer information which is mentioned to be suitable for the message, and the message is received by the user peer which is suitable for the message, the message is determined to be the message sent by the user peer itself.

If the time when the user peer joins the communication room and the data and the messages temporarily stored in the communication room are not synchronized, the data and the messages which are temporarily stored in a communication room peer are stored as historical data, and when the user peer joins the communication room peer again, the historical data and the messages are reacquired, such that a missing of receiving data and messages due to disconnection or temporary errors of the internet can be avoided. When the message and/or the data which can merely be decrypted and understood by a predetermined user peer is embedded in the information and/or data, the message or the data can only be acquired by the predetermined user peer which has joined in the communication room peer, and other user peers which have joined in the communication room would not acquire the message or the data.

Furthermore, said receiving messages sent by the user peers which have joined in the communication room, and forwarding the messages to other user peers and pilot peers which have joined in the communication room peers comprises:

receiving messages of other communication room peers sent by the pilot peer, and sending the messages to the user peers which have joined the current communication room peer via the current communication room peer, thereby delivering the same data or message to other user peers that reside in different communication room peers among the communication room peers through the pilot peer, wherein the messages comprise audio, video and any form of digital data.

The network communication method further comprises: providing a historical message and data for the user peers which have joined in the communication room peer subsequently.

In the embodiment, the messages and the data which are sent by other user peers after they join in the communication room under the condition of disconnected by the internet, the user peers which are disconnected from the network can recover the network connection at any time and join in the corresponding communication room peer, the historical data and the messages stored in the communication room peers will be sent to all user peers which have joined in the communication room peers subsequently, thereby ensuring that any message or data won't be missed or lost by the user peers even if the user peers are disconnected from the internet.

In the embodiment of the present solution, by creating communication room peers, it is ensured that, there are enough storage space to store messages and data of a plurality of user peers which are joining the communication room peers, and a basic mode and a basic architecture for providing exchange of data or messages are provided for the user peers.

It should be noted that, within the technical scope disclosed by the present solution, other sequencing schemes which can be easily thought of by one of ordinary skill in the art should be within the protection scope of the present solution, and it is not repeatedly described herein.

It should be understood that, value of serial number of the steps in the aforesaid embodiment doesn't mean a sequencing of execution sequences of the steps, the execution sequence of each of the steps should be determined by functionalities and internal logics of the steps themselves, and shouldn't be regarded as limitation to an implementation process of the embodiment of the present application.

Figure 5:
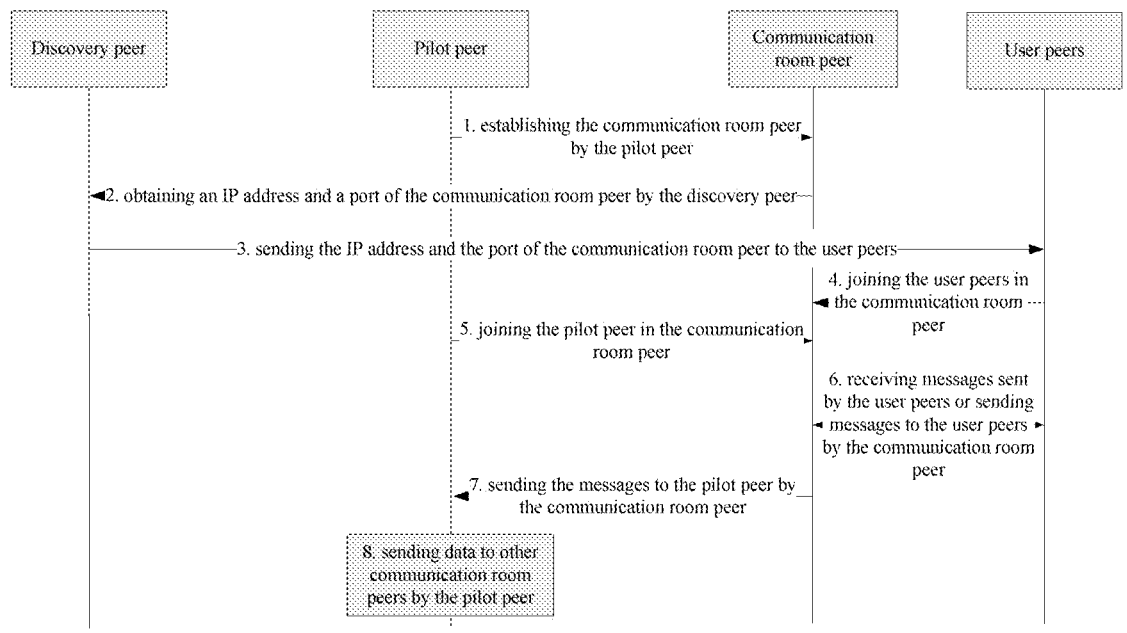
FIG. 5 illustrates an interactive flow chart of the network communication method provided by the embodiment of the present application.

FIG. 5 illustrates an interactive flow chart of a network communication method provided by an embodiment of the present application, and the executive subjects that join in the interaction process comprises at least one discovery peer 11, at least one pilot peer 12, at least one communication room peer 13 and a plurality of user peers 14 in FIG. 1, an implementation principle of the interaction flow is consistent with an implementation principle at the side of each executive subject described in FIGS. 2-4, thus, the interaction flow is briefly described, and it is not repeatedly described herein.

1, creating the communication room peer via the pilot peer;

2, obtaining an IP address and a port of the communication room peer via the discovery peer;

3, sending the IP address and the port of the communication room peer to the user peers;

4, joining the user peers in the communication room peer;

5, joining the pilot peer in the communication room peer;

6, receiving messages sent by the user peers or sending the messages to the user peers via the communication room peer;

7, sending the messages to the pilot peer via the communication room peer;

8, sending data to other communication room peers via the pilot peer.

In this embodiment, whether a new discovery peer, a new pilot peer and a new communication room peer need to be created or not depends on the number of the user peers which have established communication with the discovery peer and the number of the user peers which have joined in the communication room peers; both the newly created pilot peer and the newly created communication room peer establish communication with the discovery peer, such that the discovery peer can obtain IP addresses and ports of all pilot peers, and IP addresses and ports of all communication room peers.

Figure 6:
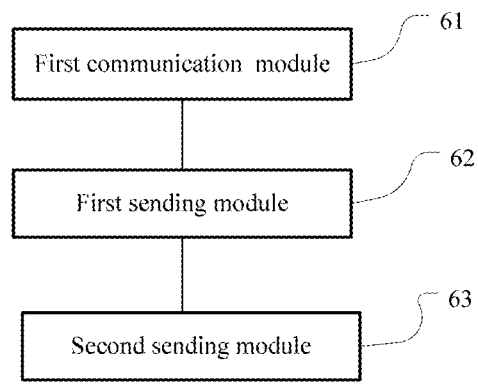
FIG. 6 illustrates a structural block diagram of the discovery peer provided by the embodiment of the present application.

FIG. 6 illustrates a structural block diagram of a discovery peer provided by an embodiment of the present solution, for describing conveniently, only the part related to this embodiment is illustrated.

Referring to FIG. 6, the discovery peer comprises:

a first communication module 61 configured to establish communication with a communication room peer, and obtaining a capacity of the communication room peer and an IP address and a port of communication room;

a first sending module 62 configured to establish communication with the pilot peer, obtain an IP address and a port of the pilot peer, and send the capacity of the communication room peer and a total number of user peers to the pilot peer, so that the pilot peer creates a required number of communication room peers based on the capacity of the communication room peer and the total number of the user peers; and a second sending module 63 configured to establish communication with the user peers, send the IP address and the port of the communication room peer to the user peers, so that the user peers join in the corresponding communication room peer to perform communication.

Figure 7:
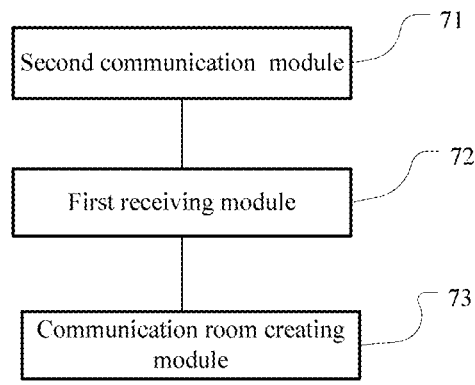
FIG. 7 illustrates a structural block diagram of the pilot peer provided by the embodiment of the present application.

FIG. 7 illustrates a structural block diagram of a pilot peer provided by an embodiment of the present solution, for describing conveniently, only the part related to the embodiment is illustrated.

Referring to FIG. 7, the pilot pair comprises:

a second communication module 71 configured to establish communication with one or more discovery peers;

a first receiving module 72 configured to receive a capacity of communication room peer and a total number of user peers sent by a discovery peer; and a communication room creating module 73 configured to create a required number of communication room peers according to the capacity and the total number of the user peers that join in communication so as to enable the communication room peer to establish communication with the discovery peer, and send the IP address and the port of the communication room peer to the user peers, so that the user peers join in the corresponding communication room and join in communication along with the communication room peer.

Figure 8:
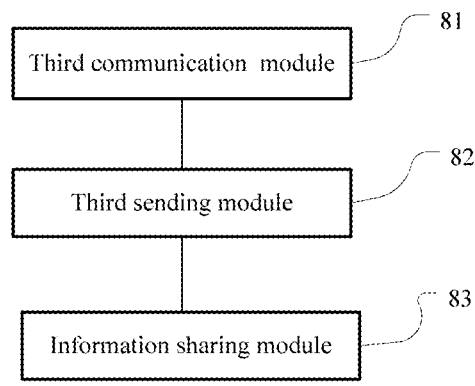
FIG. 8 illustrates a structural block diagram of the communication room peer provided by the embodiment of the present application.

FIG. 8 illustrates a structural block diagram of a communication room peer provided by an embodiment of the present solution, for describing conveniently, only the part related to this embodiment is illustrated.

Referring to FIG. 8, the communication room peer comprises:

a third communication module 81 configured to establish communication with the discovery peer, and send capacity of each communication room peer to the discovery peer to enable the discovery peer to send the capacity of the communication room peer and the total number of the user peers to the pilot peer, so that the pilot peer creates a required number of communication room peers according to the capacity and the total number of the user peers;

a third sending module 82 configured to send an address of the communication room peer that corresponds to the user peers to the discovery peer to enable the discovery peer to send the address of the communication room peer to the user peers, so that the user peers join in the corresponding communication peers; and an information sharing module 83 configured to receive messages sent by the user peers which have joined in the communication room peers, and forward the messages to other user peers and pilot peers which have joined in the communication room peers.

According to this embodiment, by establishing communication between the discovery peer and other peers, and obtaining the IP address and the port of the pilot peer, the IP address and the port of the communication room peer, the IP addresses and the ports of the user peers so as to provided communication room information for the user peers, such that the user peers can join in the corresponding communication room; the user peers which have joined in the communication room peers are enabled to send data to the communication room peers, and send the data to other user peers through the communication room peers; as an alternative, data is obtained from the communication room, such that a condition that one user peer communicates and exchanges information, data, audios, videos with thousands of other user peers can be implemented, and purchasing of a relatively expensive server is avoided when a large number of user peers perform communication, a condition that thousands of user peers join in a point-to-point network communication can be implemented based on a basic architecture of network communication provided by the discovery peer, the pilot peer, the communication room peer for the user peers, and according to expansions of the discovery peer, the pilot peer and the communication room peer; even if the user peers work behind a firewall or a router, a direct and point-to-point communication among the user peers can still be realized.

It can be clearly understood by the one of ordinary skill in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the modules in the aforesaid mobile terminal, reference can be made to a corresponding process in the aforesaid method embodiments, it is not repeatedly described herein.

Figure 9:
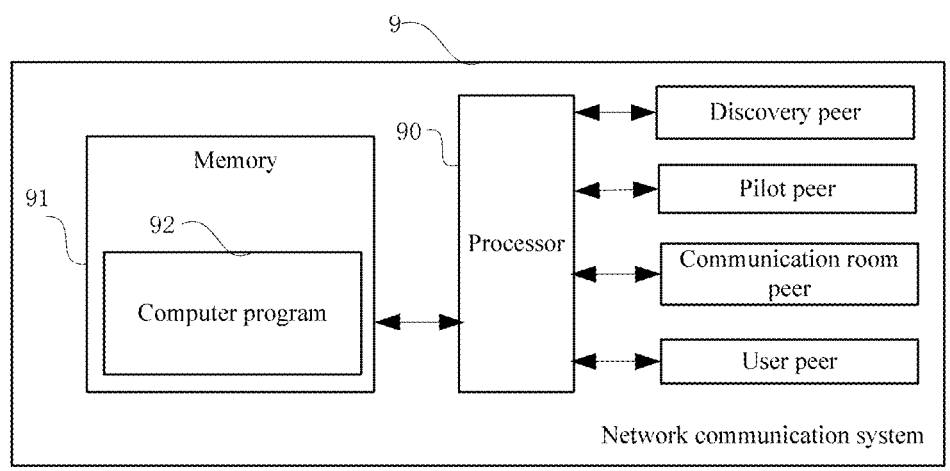
FIG. 9 illustrates a schematic diagram of a network communication system provided by the embodiment of the present application.

FIG. 9 illustrates a network communication system provided by one embodiment of the present solution. As shown in FIG. 9, the network communication system in this embodiment comprises: one or more discovery peers, one or more pilot peers, one or more communication room peers, user peers, a processor 90, a memory 91, and computer program 92 stored in the memory 91 and executable by the processor 90. When the processor 90 executes the computer program 91, steps in the aforesaid various network communication method embodiments such as the steps 101-104 shown in FIG. 1 can be implemented. As an alternative, when the processor 90 executes the computer program 92, functionalities of the various modules/units in the various device embodiments such as the functionalities of modules 61-64 shown in FIG. 6 are implemented.

Exemplarily, the computer program 92 can be divided into one or more modules/units, the one or plurality of modules/units are stored in the memory 91, and executed by the processor 90 so as to implement the present solution. The one or plurality of modules/units can be a series of computer program instruction segments that can accomplish particular functionalities, these instruction segments are used for describing an executive process of the computer program 92 in the network communication system 9.

The network communication system 9 can include but is not limited to the processor 90, the memory 91. It can be understood for one of ordinary skill in the art that, FIG. 9 is merely an example of the network communication system 9, and is not constituted as limitation to the network communication system 9, more or less components shown in FIG. Scan be included, or some components or different components can be combined; for example, the network communication system 9 can also include an input and output device, a network access device, a bus, etc.

The so called processor 80 can be CPU (Central Processing Unit), and can also be other general purpose processor, DSP (Digital Signal Processor), ASIC (Application Specific Integrated Circuit), FGPA (Field-Programmable Gate Array), or some other programmable logic devices, discrete gate or transistor logic device, discrete hardware component, etc. The general purpose processor can be a microprocessor, or alternatively, the processor can also be any conventional processor and so on.

The memory 91 can be an internal storage unit of the network communication system 9, such as a hard disk or a memory of the network communication system 9. The memory 91 can also be an external storage device of the network communication system 9, such as a plug-in hard disk, a SMC (Smart Media Card), a SD (Secure Digital) card, a FC (Flash Card) equipped on the network communication system 9. Further, the memory 91 may include both the internal storage unit and the external storage device of the network communication system 9, either. The memory 91 is configured to store the computer programs, and other procedures and data needed by the network communication system 9 for determining wellbore cross-sectional shape. The memory 91 can also be configured to storing data that has been output or being ready to be output temporarily.

It can be clearly understood by the one of ordinary skill in the art that, for describing conveniently and concisely, dividing of the aforesaid various functional units, functional modules is described exemplarily merely, in an actual application, the aforesaid functions can be assigned to different functional units and functional modules to be accomplished, that is, an inner structure of a data synchronizing device is divided into functional units or modules so as to accomplish the whole or a part of functionalities described above. The various functional units, modules in the embodiments can be integrated into a processing unit, or each of the units exists independently and physically, or two or more than two of the units are integrated into a single unit. The aforesaid integrated unit can by either actualized in the form of hardware or in the form of software functional units. In addition, specific names of the various functional units and modules are only used for distinguishing from each other conveniently, but not intended to limit the protection scope of the present application. Regarding a specific working process of the units and modules in the aforesaid device, reference can be made to a corresponding process in the aforesaid method embodiments, it is not repeatedly described herein.

In the aforesaid embodiments, the description of each of the embodiments is emphasized respectively, regarding a part of one embodiment which isn't described or disclosed in detail, please refer to relevant descriptions in some other embodiments.

One of ordinary skill in the art will notice that, the elements and algorithm steps of each of the examples described in connection with the embodiments disclosed herein can be implemented in electronic hardware, or in combination with computer software and electronic hardware. Whether these functions are implemented by hardware or software depends on the specific application and design constraints of the technical solution. The skilled people could use different methods to implement the described functions for each particular application, but such implementations should not be considered as going beyond the scope of the present solution.

It should be understood that, in the embodiments of the present application, the disclosed device/terminal device and method could be implemented in other ways. For example, the device described above are merely illustrative; for example, the division of the units is only a logical function division, and other division could be used in the actual implementation, for example, multiple units or components could be combined or integrated into another system, or some features can be ignored, or not performed. In another aspect, the coupling or direct coupling or communicating connection shown or discussed could be an indirect, or a communicating connection through some interfaces, devices or units, which could be electrical, mechanical, or otherwise.

The units described as separate components could or could not be physically separate, the components shown as units could or could not be physical units, which can be located in one place, or can be distributed to multiple network elements. Parts or all of the elements could be selected according to the actual needs to achieve the object of the present embodiment.

In addition, the various functional units in each of the embodiments of the present application can be integrated into a single processing unit, or exist individually and physically, or two or more than two units are integrated into a single unit. The aforesaid integrated unit can either be achieved by hardware, or be achieved in the form of software functional units.

If the integrated unit is achieved in the form of software functional units, and is sold or used as an independent product, it can be stored in a computer readable storage medium. Based on this understanding, a whole or part of flow process of implementing the method in the aforesaid embodiments of the present application can also be accomplished by using computer program to instruct relevant hardware. When the computer program is executed by the processor, the steps in the various method embodiments described above can be implemented. Wherein, the computer program comprises computer program codes, which can be in the form of source code, object code, executable documents or some intermediate form, etc. The computer readable medium can include: any entity or device that can carry the computer program codes, recording medium, USB flash disk, mobile hard disk, hard disk, optical disk, computer storage device, ROM (Read-Only Memory), RAM (Random Access Memory), electrical carrier signal, telecommunication signal and software distribution medium, etc. It needs to be explained that, the contents contained in the computer readable medium can be added or reduced appropriately according to the requirement of legislation and patent practice in a judicial district, for example, in some judicial districts, according to legislation and patent practice, the computer readable medium doesn't include electrical carrier signal and telecommunication signal.

As stated above, the aforesaid embodiments are only intended to explain but not to limit the technical solutions of the present application. Although the present application has been explained in detail with reference to the above-described embodiments, it should be understood for the one of ordinary skill in the art that, the technical solutions described in each of the above-described embodiments can still be amended, or some technical features in the technical solutions can be replaced equivalently; these amendments or equivalent replacements, which won't make the essential of corresponding technical solution to be broken away from the spirit and the scope of the technical solution in various embodiments of the present application, should all be included in the protection scope of the present application.

What is claimed is:

1. A network communication method, wherein the network communication method is applied to a peer-to-peer network communication system, the peer-to peer network communication system comprises one or more discovery devices, one or more pilot devices, one or more communication room devices and at least two user devices:
    wherein, the discovery device is configured to discover IP addresses and ports of other devices, the pilot device is configured to create a communication room device and to share data in the communication room device; the communication room device is configured to temporarily store and transmit communication data; the user devices are configured to join in a communication room to perform communication;
the network communication method comprises:
    establishing communication with the communication room device, and obtaining a capacity of the communication room device, and an IP address and a port of the communication room;
    establishing communication with the pilot device, obtaining an IP address and a port of the pilot device, sending the capacity of the communication room and the total number of the user devices to the pilot device, so that the pilot device creates a required number of communication room devices based on the capacity of the communication room and the total number of the user devices; and
    establishing communication with the user devices, sending the IP address and the port of the communication room device to the user devices, so that the user devices join in the corresponding communication room device to perform communication;
the network communication method further comprises:
    joining the pilot device in a created communication room device at the time when the pilot device establishes the communication room device; and
    receiving messages sent by the user devices which have joined in the communication room device and forwarding the messages to other communication room devices by the pilot device.

2. The network communication method according to claim 1, wherein said establishing communication with the communication room device, and obtaining the capacity of the communication room device, and the IP address and the port of communication room comprises:
    sending categories of the user devices which have joined in the communication room device to other communication room devices according to the IP address and the port of the communication room device.

3. The network communication method according to claim 2, wherein said establishing communication with the pilot device, obtaining the IP address and the port of the pilot device, sending the capacity of the communication room and the total number of the user devices to the pilot device, so that the pilot device creates a required number of the communication room devices based on the capacity of the communication room and the total number of the user devices comprises:
    receiving a number of communication room devices created and sent by the pilot device.

4. The network communication method according to claim 3, wherein said establishing communication with the user devices, sending the IP address and the port of the communication room device to the user devices, so that the user devices join in the corresponding communication room device to perform communication comprises:
    establishing a new discovery device if the number of connected user devices exceeds the capacity of the current discovery device, wherein the new discovery device establishes communication with the user devices.

5. The network communication method according to claim 1, further comprising:
    creating a new pilot device if the message amount of the communication room processed by the current pilot devices exceeds the capacity of the pilot devices, after establishing communication with the user devices, sending the IP address and the port of the communication room device to the user devices, so that the user devices join in the corresponding communication room device to perform communication.

6. The network communication method according to claim 1, further comprising:
    sending categories of the user devices which have joined in the communication room devices to the discovery device in order that the discovery device sends the categories of the user devices in each communication room device to other communication devices, after establishing communication with the user devices, sending the IP address and the port of the communication room device to the user devices, so that the user devices join in the corresponding communication room device to perform communication.

7. The network communication method according to claim 1, further comprising:
    storing data and messages temporarily stored in the communication room as historical data and messages if the time when the user device joins the communication room doesn't synchronize with the data and the messages temporarily stored in the communication room; and reacquiring the historical data and messages when the user peer joins the communication room device again, after establishing communication with the user devices, sending the IP address and the port of the communication room device to the user devices, so that the user devices join in the corresponding communication room device to perform communication.

8. The network communication method according to claim 1, further comprising:
    embedding information that can only be decrypted and interpreted by a predetermined user device in message and/or data, so that the message and/or data embedded with the information can only be acquired by the predetermined user device that has joined in the communication room device.

9. The network communication method according to claim 8, further comprising:
sending the historical data and messages stored in the communication room devices to all user devices which have recovered network communication and joined in the communication room devices later, after storing data and messages temporarily stored in the communication room as historical data and messages.

10. The network communication method according to claim 1, wherein said establishing communication with the pilot device, obtaining an IP address and a port of the pilot device, sending the capacity of the communication room and the total number of the user devices to the pilot device, so that the pilot device creates a required number of communication room devices based on the capacity of the communication room and the total number of the user devices further comprises:
establishing communication room devices corresponding to different application types by the pilot devices that correspond to different applications.

11. The network communication method according to claim 1, further comprising:
tracking information that the user devices leave the communication room devices by the pilot device.

12. A network communication method, wherein the network communication method is applied to a peer-to-peer network communication system and comprises:
establishing communication with one or more discovery device;
receiving a capacity of a communication room device and a total number of user devices sent by a discovery device;
establishing a required number of communication room devices according to the capacity and the total number of user devices which have joined in communication to enable the communication room device to establish communication with the discovery device, and send an Internet Protocol (IP) address and a port of the communication room device to the user devices, such that the user devices join in corresponding communication room and join in communication along with the communication room device;
wherein said establishing a required number of communication room devices according to the capacity and the total number of user devices which join in communication to enable the communication room device to establish communication with the discovery device, and send the IP address and the port of the communication room device to the user devices, such that the user devices join in corresponding communication room and join in communication along with the communication room device further comprises:
joining the pilot device in a created communication room device at the time when the pilot device establishes the communication room device; and
receiving messages sent by the user devices which have joined in the communication room device, and forwarding the messages to other communication room devices.

13. The network communication method according to claim 12, wherein said establishing a required number of communication room devices according to the capacity and the total number of user devices which have joined in communication to enable the communication room devices to establish communication with the discovery device, and send an IP address and a port of the communication room device to the user devices, such that the user devices join in corresponding communication room and join in communication along with the communication room device comprises:
sending the number of created communication room devices to the discovery device, so that the user devices which establish communication with the discovery device join in the corresponding communication room device.

14. The network communication method according to claim 12, further comprising:
synchronizing all pilot devices together and synchronizing all communication room devices together, so that one user device resides in one communication room device can communicate with another user device resides in a different communication room device.

15. The network communication method according to claim 12, further comprising:
creating a new pilot device if a message amount of communication room processed by the current pilot device exceeds the capacity of the pilot device, so that the new pilot device creates more communication room devices and processes messages of the communication room devices.

16. A network communication method, wherein the network communication method is applied to a peer-to-peer network communication system and comprises:
establishing communication with a discovery device, and sending a capacity of a communication room peer-device to the discovery device to enable the discovery device to send the capacity of communication room and a total number of user devices to a pilot device, so that the pilot device creates a required number of communication room devices according to the capacity and the total number of the user devices;
sending an address of the communication room device that corresponds to the user devices to the discovery device to enable the discovery device to send the address of the communication room device to the user devices, so that the user devices join in the corresponding communication room device; and
receiving messages sent by the user devices which have joined in the communication room device, and forwarding the messages to other user devices and pilot devices which have joined in the communication room device by the pilot device.

17. The network communication method according to claim 16, wherein said sending communication room information that corresponds to the user devices to the discovery device to enable the discovery device to send the address of the communication room device to the user devices, so that the user devices join in the corresponding communication room device comprises:
sending a category of each of user peers which have joined in the communication room device to the discovery device, so that the discovery device send the category of each of the user devices which have joined in the communication room peer to other communication room devices.

18. The network communication method according to claim 16, wherein said receiving messages sent by the user devices which have joined in the communication room device, and forwarding the messages to other user devices and pilot devices which have joined in the communication room device comprises:

receiving, via the current communication room device, messages of other communication room devices sent by the pilot device and sending the messages to the user devices which have joined the current communication room device.

\* \* \* \* \*